(12) United States Patent
Shimizu

(10) Patent No.: US 9,768,642 B2
(45) Date of Patent: Sep. 19, 2017

(54) AUXILIARY POWER SYSTEM

(71) Applicant: SAMSUNG SDI CO., LTD., Yongin-si, Gyeonggi-do (KR)

(72) Inventor: Yukihiro Shimizu, Osaka (JP)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 14/841,598

(22) Filed: Aug. 31, 2015

(65) Prior Publication Data

US 2016/0064970 A1    Mar. 3, 2016

(30) Foreign Application Priority Data

Sep. 3, 2014  (JP) ................................. 2014-179416
Apr. 30, 2015 (KR) ........................ 10-2015-0062051

(51) Int. Cl.
| | |
|---|---|
| *H02J 7/00* | (2006.01) |
| *H02J 11/00* | (2006.01) |
| *H02J 3/38* | (2006.01) |

(52) U.S. Cl.
CPC ............... *H02J 11/00* (2013.01); *H02J 3/386* (2013.01); *Y02E 10/763* (2013.01); *Y02P 80/21* (2015.11)

(58) Field of Classification Search
CPC ............................. H02J 7/0016; H02J 7/0021
USPC ....................................................... 320/134
See application file for complete search history.

(56) References Cited

U.S. PATENT DOCUMENTS 8,575,886 B2 * 11/2013 Oohara et al. ............ H02J 3/32
290/44

FOREIGN PATENT DOCUMENTS

| JP | 2001-327080 A | 11/2001 |
|---|---|---|
| JP | 2001-346332 A | 12/2001 |
| JP | 2014-042415 A | 3/2014 |

OTHER PUBLICATIONS

English machine translation of Japanese Publication No. JP 2001-327080 A, dated Nov. 22, 2001, 23 pages.
English machine translation of Japanese Publication No. JP 2001-346332 A, dated Dec. 14, 2001, 7 pages.
English machine translation of Japanese Publication No. JP 2014-042415 A, dated Mar. 6, 2014, 7 pages.

* cited by examiner

*Primary Examiner* — Sun Lin
(74) *Attorney, Agent, or Firm* — Lewis Roca Rothgerber Christie LLP

(57) ABSTRACT

According to aspects of embodiments of the present invention, an auxiliary power system includes: a plurality of storage batteries having different charge/discharge characteristics; a receiving unit configured to externally receive a value for instructing to charge/discharge power for charging/discharging the plurality of storage batteries; and a control unit configured to calculate an indicator value indicating a spread degree of distribution of the value for instructing to charge/discharge power and to change one or more of the storage batteries to be charged/discharged from the plurality of storage batteries according to the indicator value.

11 Claims, 12 Drawing Sheets

AUXILIARY POWER SYSTEM

CROSS-REFERENCE TO RELATED APPLICATION

This application claims priority to and the benefit of Japanese Patent Application No. 2014-179416 filed on Sep. 3, 2014 and Korean Patent Application No. 10-2015-0062051 filed on Apr. 30, 2015, the entire contents of which are incorporated herein by reference.

BACKGROUND

1. Field

Aspects of embodiments of the present invention relate to an auxiliary power system.

2. Description of the Related Art

In power generation systems using renewable energy, such as wind power generation or photovoltaic power generation, power supply may be unstable.

Therefore, technologies for preventing storage batteries from being insufficiently or not fully charged and suppressing an output variation from a power generation system such as a wind power generation or a photovoltaic power generation system to a power system have been proposed.

In addition, by monitoring a variation amount of the power generated by the power generation system and determining whether to operate or stop a converter installed together with the storage batteries depending on an variation amount, technologies for avoiding loss caused by the operation of the converter and reducing power generated by the power generation system have been proposed.

Further, a technology, which is aimed at extending a lifespan of the storage battery by distributing amplitudes and frequencies of charge/discharge patterns to a plurality of storage batteries according to amplitude values of the power system to decrease the charge/discharge frequencies of the storage battery and to suppress power generated by the power generation system, has been proposed.

However, when an output variation from the power generation system to the power system is large, the variation cannot be sufficiently suppressed. The storage battery may be insufficiently charged or fully charged, and as a result, degradation of the storage battery may speed up, and a cycle-life thereof may become shorter.

In addition, when determining whether to operate or stop the converter installed together with the storage batteries according to the variation amount of the power generated by the power generation system, a threshold value for determining the operation or stoppage may not be appropriately calculated, thereby failing to appropriately perform the operation or stoppage of the converter. Accordingly, the power generated by the power generation system may not be suppressed.

When respectively distributing amplitudes and frequencies of the charge/discharge patterns to the multiple different storage batteries according to the amplitude values of the power system, a threshold value, which is an indicator for determining the distribution, may not be appropriately calculated, so the power generated by the power generation system may not be suppressed.

In addition, the distribution of the number of charges/discharges of the storage battery may be concentrated on the specific storage battery by the calculated threshold value, and the storage battery in which the number of charges/discharges also extremely increases may be present.

As a result, in some cases, degradation of the storage battery may speed up, and a cycle-life thereof may become shorter.

The above information disclosed in this Background section is only to enhance the understanding of the background of the invention, and therefore it may contain information that does not constitute prior art.

SUMMARY

Aspects of embodiments of the present invention include an auxiliary power system that is capable of reducing a variation of generated power of a power generation system and extending a lifespan of a storage battery.

According to aspects of embodiments of the present invention, an auxiliary power system includes: a plurality of storage batteries having different charge/discharge characteristics; a receiving unit configured to externally receive a value for instructing to charge/discharge power for charging/discharging the plurality of storage batteries; and a control unit configured to calculate an indicator value indicating a spread degree of distribution of the value for instructing to charge/discharge power and to change the storage batteries to be charged/discharged from the plurality of storage batteries according to the indicator value.

The plurality of storage batteries may include: a first storage battery in which more power charging/discharging is performed with respect to electrical capacitance; and a second storage battery in which less power charging/discharging is performed with respect to the electrical capacitance than in the first storage battery, wherein the control unit, after comparing a threshold value based on the indicator value with the value for instructing to charge/discharge power, is configured to charge/discharge the first storage battery when an absolute value of the value for instructing to charge/discharge power is greater than an absolute value of the threshold value, and to charge/discharge the second storage battery when an absolute value of the value for instructing to charge/discharge power is smaller than an absolute value of the threshold value.

The control unit may be configured to control electrical capacitance of the storage battery to approximate a target value.

The control unit may be configured to calculate the indicator value according to the value for instructing to charge/discharge power during a control reference period according to an installation condition of the auxiliary power system.

The control unit may be configured to calculate a normal distribution by calculating a standard deviation as the indicator value when applying the value for instructing to charge/discharge power to a normal distribution.

The control unit may be configured to multiply a deviation value based on the standard deviation and an occurring frequency of the normal distribution to calculate an estimated distribution of an amount of power charged/discharged.

According to some example embodiments of the present invention, an auxiliary power system includes: a plurality of storage batteries having different charge/discharge characteristics; a receiving unit configured to receive generated power data corresponding to an amount of power generated via an external power generation system; a calculation unit configured to calculate target charge/discharge power data corresponding to a required amount of power charged/discharged based on a predetermined number of recently received pieces of generated power data and to calculate a probability distribution from a group of the target charge/discharge power data; and a control unit configured to selectively charge/discharge the plurality of storage batteries based on the probability distribution.

The calculation unit may be configured to calculate an estimated distribution of the charge/discharge power data of a following second period, and the control unit may be configured to selectively charge/discharge the plurality of storage batteries according to the estimated distribution of the charge/discharge power data.

The estimated distribution of the charge/discharge power data may be calculated by multiplying a deviation value and an occurring frequency of the probability distribution.

The plurality of storage batteries may include a first storage battery and a second storage battery, a threshold value may be calculated based on SOC values of the first and second storage batteries and the estimated distribution of the charge/discharge power data, and the control unit may be configured to control charge/discharge of the first and second storage battery based on the threshold value.

A charge/discharge rate of the first storage battery may be greater than that of the second storage battery, and the control unit may be configured to charge/discharge the first storage battery when an absolute value of a value of the target charge/discharge power data is greater than an absolute value of the threshold value, and to charge/discharge the second storage battery when an absolute value of a value of the target charge/discharge power data is less than an absolute value of the threshold value.

According to some example embodiments of the present invention, the auxiliary power system may be capable of reducing the variation of the generated power of the power generation system and extending the lifespan of the storage battery.

DETAILED DESCRIPTION

Figure 1:
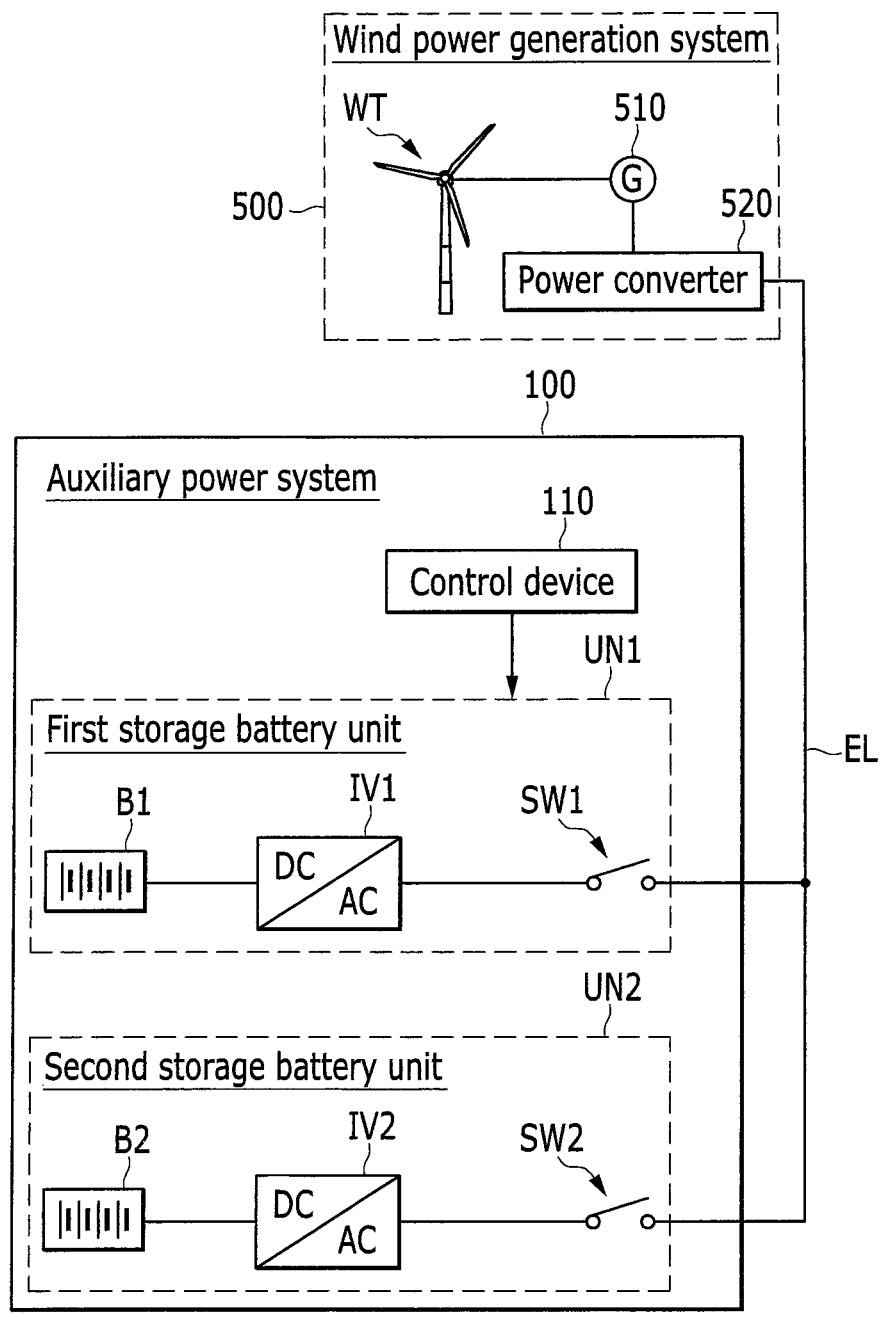
FIG. 1 is a drawing that illustrates an auxiliary power system according to a first example embodiment.

Hereinafter, aspects of example embodiments according to the present invention will be described in more detail with reference to the accompanying drawings. Certain detailed description of the disclosed functions or configurations that may obscure the subject matter of the present invention may be omitted. It should be noted that like reference numerals designate like elements throughout the specification and the drawings.

Terms or words used in the present specification and claims, which will be described below, should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application. Further, terms such as first, second, and the like, which are used to describe various components, are used only to distinguish one component from other components, but are not used to limit the components.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Auxiliary power systems of example embodiments will now be described with reference to the drawings.

FIG. 1 is a schematic diagram that illustrates one example of an auxiliary power system according to a first example embodiment.

The auxiliary power system 100 is provided together with a power generation system having unstable power supply capability to a power system and thus is a system for assisting the power system to reduce variation of supplied power.

The auxiliary power system 100 includes a plurality of storage batteries to which surplus power from total power generated by the power generation system, which is excessive compared with required power (or utilized power) of the power system, is charged.

When switching between and controlling the storage batteries to be operated from the plurality of storage batteries, the auxiliary power system 100 receives, for example, a value for instructing to charge/discharge power from a host server, such as a host EMS (Energy Management System).

The value for instructing to charge/discharge power is a value for charging power (e.g., predetermined power) supplied from outside of the storage battery to inside thereof or a value for discharging power (e.g., predetermined power) from inside of the storage battery to outside thereof.

In the current example embodiment, the auxiliary power system 100 for assisting a wind power generation system 500 will now be described.

The wind power generation system 500 is connected to the auxiliary power system 100 via electrical lines EL.

The wind power generation system 500 includes a windmill WT having a rotation shaft, and a power generator 510, and a power converter 520 that are connected to the rotation shaft.

In the windmill WT, a plurality of rectangular plate-shaped or strip plate-shaped blades are connected to the rotation shaft, and may be arranged or positioned to have angles that are equal relative to each other in a circumferential direction.

The windmill WT rotates by receiving wind to the blade, and allowing the rotation shaft connected thereto to rotate.

The power generator 510 connected to the rotation shaft transforms rotation energy generated by the rotation of the rotation shaft into electrical energy, thereby generating AC power.

The power converter 520 transforms the power generated by the power generator 510 into power for distribution, and provides the power for distribution to the outside (e.g., external devices or components) via the electrical lines EL.

Accordingly, the AC power generated by the power generator 510 is provided to the auxiliary power system 100 via the power converter 520 and the electrical lines EL.

In addition, the wind power generation system 500 transmits data (generated power data) indicating an amount of power generated in its own power generation system to the auxiliary power system 100.

The generated power data may be calculated by a control device and the like that are included in the wind power generation system 500.

On the other hand, in the current example embodiment, example embodiments of the wind power generation system 500 are described as part of the power generation system, but the present invention is not limited thereto.

For example, the power generation system may include any suitable power generation system, including a variety of power generation systems utilizing renewable energy, such as a solar power generation system, a geothermal power generation system, a biomass power generation system, etc.

The solar power generation system may be connected to the auxiliary power system 100 via the electrical lines.

The solar power generation system may include a solar cell and a power converter. The solar cell may be made up of a crystalline silicon-based or amorphous silicon-based semiconductor.

The solar cell may transform light energy included in solar light irradiated to the semiconductor into electrical energy, thereby generating DC power.

The power converter transforms the power generated by the solar cell into power for distribution, and provides the power for distribution to the outside (e.g., external devices or components) via the electrical lines.

Accordingly, the DC power generated by the solar cell may be provided to the auxiliary power system 100 via the power converter and the electrical lines.

The auxiliary power system 100 includes a control device 110, a first storage battery unit UN1, and a second storage battery unit UN2.

The first storage battery unit UN1 and the second storage battery unit UN2 are connected in parallel.

The auxiliary power system 100 supplies the AC power provided by the wind power generation system 500 to the first storage battery unit UN1 or the second storage battery unit UN2.

Hereinafter, the first storage battery unit UN1 and the second storage battery unit UN2 will be collectively referred to as the storage battery unit when not being distinguished from each other.

In addition, the auxiliary power system 100 may use a plurality of storage batteries having different charge/discharge characteristics, for example, different charge/discharge rates.

In the current example embodiment, a case in which the first storage battery unit UN1 and the second storage battery unit UN2 include storage batteries respectively having different charge/discharge characteristics will be described according to some example embodiments of the present invention.

The first storage battery unit UN1 includes, for example, a switch SW1, an inverter IV1, and a first storage battery B1.

The first storage battery unit UN1 transmits a state of charge (SOC) value indicating electrical capacitance (state of charge) of the first storage battery B1 to the control device 110.

The switch SW1 is a switch that allows the first storage battery unit UN1 and the wind power generation system 500 to be in a conductive or cut-off state therebetween depending on a control operation of the control device 110.

For example, when an ammeter detects a fault current associated with a short-circuit fault and the like, the switch SW1 allows the first storage battery unit UN1 and the wind power generation system 500 to be in the cut-off state therebetween before the fault current flows to the inverter IV1 and the first storage battery B1 at a rear end of the switch SW1, thereby preventing the fault current from flowing to the first storage battery unit UN1.

Accordingly, the auxiliary power system 100 can be protected, and the fault current can be prevented from flowing to the wind power generation system 500.

In addition, when performing maintenance of the auxiliary power system 100, the switch SW1 permits the first storage battery unit UN1 and the wind power generation system 500 to be in the cut-off state therebetween, and separates the auxiliary power system 100 from the power generation system 500.

Accordingly, maintenance work can be more safely performed.

The inverter IV1 is a transforming device that transforms the AC power provided from the wind power generation system 500 into DC power.

The inverter IV1 charges the first storage battery B1 using the transformed DC power according to the control of the control device 110.

Further, the inverter IV1 discharges the power (the DC power) stored by the first storage battery B1 according to the control of the control device 110.

The inverter IV1 transforms the DC power discharged from the first storage battery B1 into AC power.

The first storage battery B1 may be a rechargeable battery having a charge/discharge rate of 2 C or more, showing a charge/discharge characteristic enabling a large amount of charge/discharge to be performed.

The charge and discharge rate (unit: C) is a ratio of current at discharge relative to nominal capacity of the battery.

For example, in the first storage battery B1 having a charge/discharge rate of 2 C and a capacity value of 5 Ah, a current of 10 A can be discharged or charged within 0.5 h.

The first storage battery B1 may be, for example, a rechargeable battery such as a lead storage battery, a sodium-sulfur battery, a redox flow battery, a nickel-metal hydride battery, a lithium-ion battery, or the like.

On the other hand, the first storage battery B1 and the second storage battery B2 to be described below are controlled to be closest to a state of having least degradation in accordance with the control device 110.

The state of having the least degradation may be, for example, a state when the SOC value is 50%. Hereinafter, the SOC value having the least degradation will be referred to as a target value.

The target value is not limited to 50%, and may be determined according to kinds and types of the first storage battery B1 and the second storage battery B2, or may be determined by a use environment (temperature, humidity, etc.) of the auxiliary power system 100 (the first storage battery B1 and the second storage battery B2).

The second storage battery unit UN2 includes a switch SW2, an inverter IV2, and a second storage battery B2. The second storage battery unit UN2 transmits a SOC value of the second storage battery B2 to the control device 110.

The switch SW2 is a switch that allows the second storage battery unit UN2 and the wind power generation system 500 to be in a conductive or cut-off state therebetween depending on a control operation of the control device 110.

For example, when an ammeter detects a fault current associated with a short-circuit fault and the like, the switch SW2 allows the second storage battery unit UN2 and the wind power generation system 500 to be in the cut-off state therebetween before the fault current flows to the inverter IV2 and the second storage battery B2 at a rear end of the switch SW2, thereby preventing (or reducing instances of) the fault current from flowing to the second storage battery unit UN2.

Accordingly, the auxiliary power system 100 can be protected, and the fault current can be prevented from flowing to the wind power generation system 500.

In addition, when performing maintenance of the auxiliary power system 100, the switch SW2 permits the second storage battery unit UN2 and the wind power generation system 500 to be in the cut-off state therebetween, and separates the auxiliary power system 100 from the power generation system 500. Accordingly, maintenance work can be more safely performed.

The inverter IV2 transforms AC power provided from the wind power generation system 500 into DC power.

The inverter IV2 charges the transformed DC power to the second storage battery B2 according to the control of the control device 110.

In addition, the inverter IV2 discharges the power (the DC power) stored in the second storage battery B2 according to the control of the control device 110.

The inverter IV2 transforms the DC power discharged from the second storage battery B2 into AC power.

The second storage battery B2 may be, for example, a rechargeable battery having a charge/discharge rate of about 1 C, showing a charge/discharge characteristic that is smaller than that of the first storage battery B1.

For example, in the second storage battery B2 having a charge/discharge rate 1C and a capacity value of 5 Ah, a current of 5 A may be discharged (or charged) within one hour.

The second storage battery B2 may be, for example, a rechargeable battery such as a lead storage battery, a sodium-sulfur battery, a redox flow battery, a nickel-metal hydride battery, a lithium-ion battery, or the like.

Next, a functional configuration of the control device 110 according to the first example embodiment will be described in detail with reference to FIG. 2.

Figure 2:
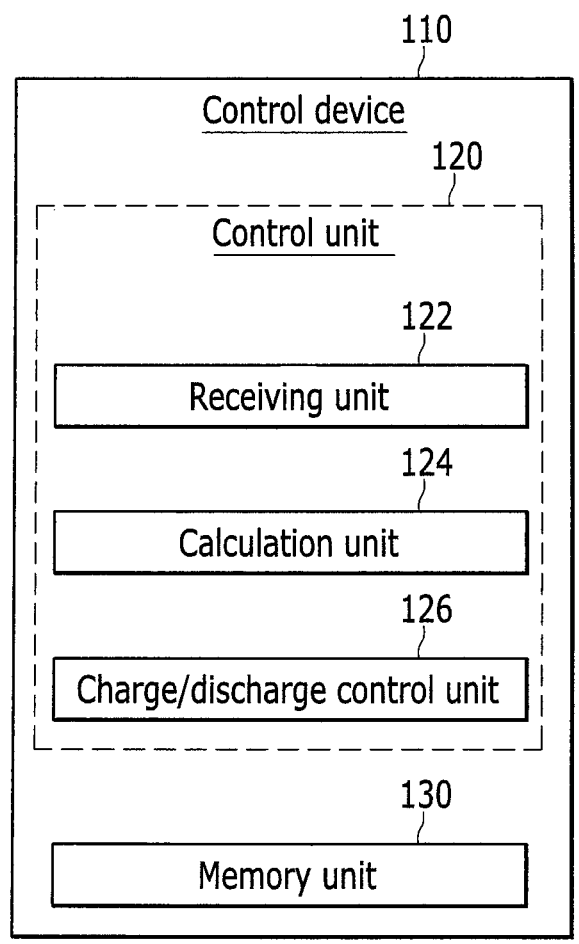
FIG. 2 is a drawing that illustrates a configuration of a control device according to the first example embodiment.

FIG. 2 is a drawing that illustrates one example of a functional configuration of the control device 110 according to the first example embodiment.

The control device 110 may be a computer device that controls the first storage battery unit UN1 and the second storage battery unit UN2.

The control device 110 is a computer device that includes a processor, such as a CPU (Central Processing Unit), a memory unit 130 such as a ROM (Read Only Memory), a RAM (Random Access Memory), an HDD (Hard Disk Drive), an EEPROM (Electrically Erasable Programmable Read-Only Memory), a flash memory, etc., and a communication interface for communicating with other devices.

The control device 110 includes a control unit 120 and the memory unit 130.

The control unit 120 includes a receiving unit 122, a calculation unit 124, and a charge/discharge control unit 126.

The control unit 120 may be implemented, for example, as a software function unit that functions by executing a program stored in the memory unit 130 by the processor.

In addition, each of the function units of the control unit 120 may be partly or entirely implemented by a hardware function unit, such as through LSI (Large Scale Integration) or an ASIC (Application Specific Integrated Circuit).

The receiving unit 122 receives generated power data transmitted from the wind power generation system 500 at predetermined transmission time intervals.

In the present invention, the transmission time interval of the wind power generation system 500 and other conditions are described as an installation condition of the auxiliary power system 100.

For example, the receiving unit 122 receives the generated power data transmitted every 10 seconds from the wind power generation system 500 for a control reference period (e.g., one hour).

The receiving unit 122 matches the received generated power data and the received time, and stores them in the memory unit 130.

In addition, the receiving unit 122 receives a SOC value of the first storage battery transmitted from the first storage battery unit UN1 and a SOC value of the second storage battery transmitted from the second storage battery unit UN2.

The receiving unit 122 stores the received SOC value of the first storage battery and the received SOC value of the second storage battery in the memory unit 130.

The memory unit 130 is controlled to store a period, a value for instructing to charge/discharge power, the generated power data, target charge/discharge power data, a statistical value, a standard deviation $\sigma$, an average value $\mu$, etc. that are associated with the installation condition of the auxiliary power system 100.

On the other hand, the memory unit 130 may not be included in the control device 110, and may be configured as an external storage device (e.g., a network-attached storage (NAS) device).

The calculation unit 124 calculates statistical values, such as a moving average and the like, from the generated power data stored in the memory unit 130.

The calculation unit 124 calculates, for example, a moving average from a total of 16 generated pieces of power data for 160 seconds when the receiving unit 122 is configured to receive the generated power data once every 10 seconds.

The calculation unit 124 recalculates the calculated moving average every time it is updated.

If generated power data recently received is Dw(k) and generated power data received n times prior is Dw(k−n), the calculation unit 124 calculates a moving average Mw(k) using the following Equation 1 every time the receiving unit 122 receives the generated power data.

In the current example embodiment, the calculation unit 124 calculates the moving average as an average value of 16 pieces of received data, but the present invention is not limited thereto.

The calculation unit 124 may calculate, for example, the moving average as an average value of 32 pieces of received data, and may arbitrarily determine a parameter depending on a processing speed of the system and the like.

A configuration for performing such processing may be, for example, a hardware function unit, such as a low pass filter (LPF).

$$Mw(k) = \{Dw(k) + Dw(k-1) + Dw(k-2) + \ldots + Dw(k-15)\}/16 \quad \text{Equation 1:}$$

The calculation unit 124 calculates the target charge/discharge power data within the control reference period based on a difference between the calculated moving average and the recently generated power data Dw(k).

The target charge/discharge power data represents data that indicates power to be charged/discharged by the auxiliary power system 100.

The target charge/discharge power data Pd(k) may be calculated by the following Equation 2.

A positive sign of the target charge/discharge power data Pd(k) represents an amount of power to discharge, and a negative sign thereof represents an amount of power to charge.

$$Pd(k) = Mw(k) - Dw(k) \quad \text{Equation 2:}$$

Figure 3:
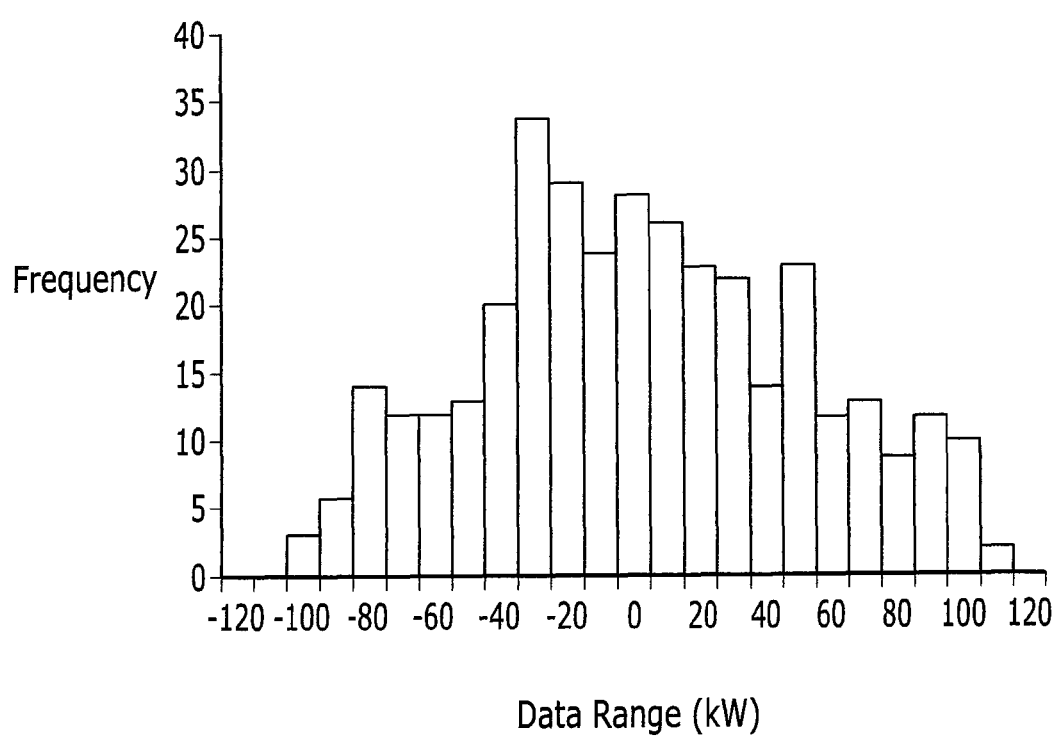
FIG. 3 is a drawing that illustrates one example of a frequency distribution of target charge/discharge power data for one hour.

FIG. 3 illustrates one example of the target charge/discharge power data that is calculated by the Equations 1 and 2.

FIG. 3 is a drawing that illustrates one example of a frequency distribution of the target charge/discharge power data for one hour.

The calculation unit 124 calculates the standard deviation $\sigma$ and the average value $\mu$ of the target charge/discharge power data Pd(k), as an indicator value representing a spread degree of distribution, from the calculated target charge/discharge power data Pd(k).

The calculation unit 124 may calculate, for example, a standard deviation of 51.0 kW and an average value of 0 kW from the frequency distribution illustrated in FIG. 3.

On the other hand, the average value $\mu$ may be obtained to be a value other than zero depending on a calculating (sampling) method of the moving average.

The calculation unit 124 calculates a probability distribution representing probability density of the target charge/discharge power data, based on a normal distribution using the calculated standard deviation $\sigma$ and average value $\mu$ as parameters.

Figure 4:
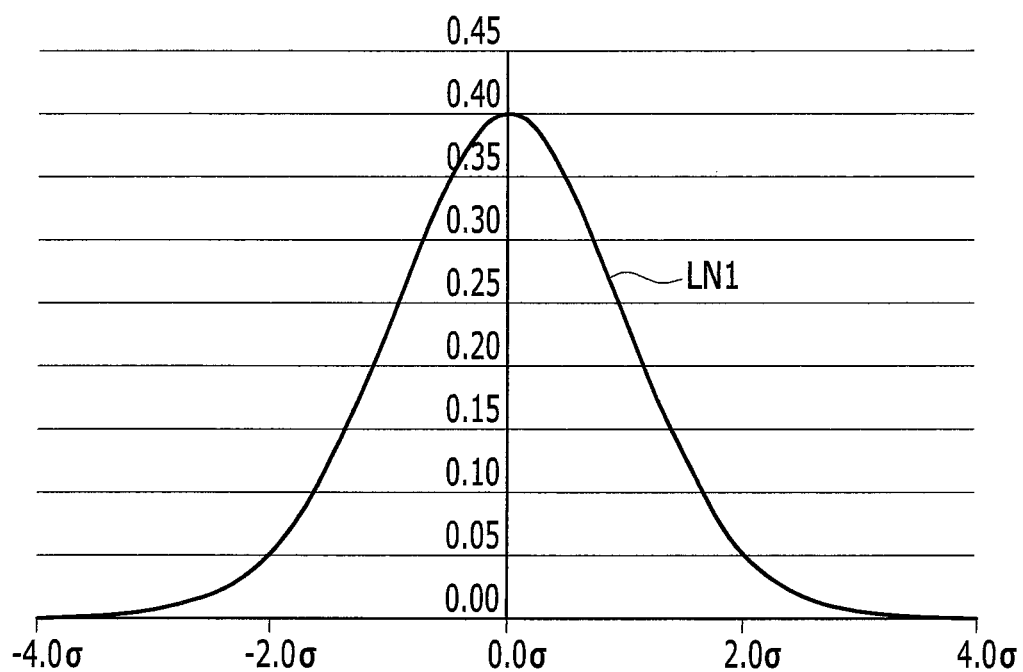
FIG. 4 is a drawing that illustrates one example of a probability distribution calculated by a calculation unit.

FIG. 4 is a drawing that illustrates one example of a probability distribution calculated by the calculation unit 124.

A horizontal axis of FIG. 4 represents a charging/discharging instruction value (unit: kW). In addition, a vertical axis of FIG. 4 represents probability density.

In FIG. 4, a curve LN1 represents a distribution curve of the normal distribution. The probability distribution illustrated in FIG. 4 is normalized in advance such that an area surrounded by the distribution curve is equal to 1.

The calculation unit 124 multiplies a deviation value representing a probability variable of the calculated probability distribution (horizontal axis) and a frequency represented by the curved line of the calculated probability distribution (vertical axis), thereby calculating distribution of charge/discharge power data for estimating charge/discharge for the next control reference period (e.g., one hour).

Hereinafter, the distribution of the charge/discharge power data for estimating charge/discharge for the next control reference period will be referred to as estimated distribution of the charge/discharge power data.

Figure 5:
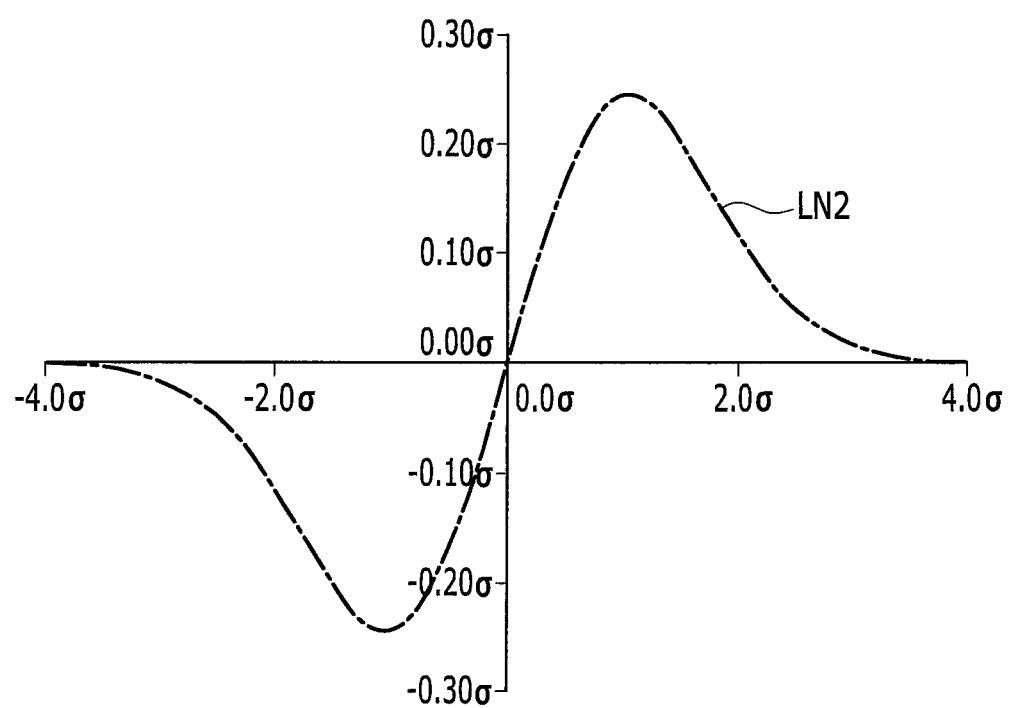
FIG. 5 is a drawing that illustrates one example of an estimated distribution of charge/discharge power data.

FIG. 5 is a drawing that illustrates one example of the estimated distribution of the charge/discharge power data.

A horizontal axis of FIG. 5 represents a charging/discharging instruction value (unit: kW). In addition, a vertical axis of FIG. 5 represents power (unit: kW).

In FIG. 5, a curve LN2 represents a distribution curve of the estimated distribution of the charge/discharge power data.

As illustrated in FIG. 5, for example, in a probability variable of high occurring frequency near a starting point 0, at a point where a power value of the charge/discharge power data is lowest, values of the estimated distribution of the charge/discharge power data are concentrated near 0.

At points shifted toward (+)/(−) sides, absolute values of the estimated distribution slowly increase, and have a maximum value around +1σ and −1σ.

On the other hand, an area surrounded by the distribution curve of the estimated distribution of the charge/discharge power data corresponds to an amount of power.

The calculation unit 124 calculates and configures, based on the estimated distribution of the calculated charge/discharge power data and the SOC value of the first storage battery stored in the memory unit 130 and the SOC value of the second storage battery, allocation switching threshold values TH1 and TH4 and operation stop switching threshold values TH2 and TH3.

The allocation switching threshold value TH1 is a value for switching between the storage battery unit to be in a charge state and the storage battery unit to be in a stop state from the first and second storage battery units UN1 and UN2, the operation stop switching threshold value TH2 is a value for the second storage battery unit to switch to the charge or stop state, the operation stop switching threshold value TH3 is a value for the second storage battery unit to switch to a discharge state or stop state, and the allocation switching threshold value TH4 is a value for switching between the storage battery unit to be in the discharge state and the storage battery unit to be in the stop state of the first and second storage battery units UN1 and UN2, with each of the threshold values set according to the estimated distribution of the charge/discharge power data.

A method for configuring the threshold values will now be described with reference to FIG. 6, according to some example embodiments of the present invention.

Figure 6:
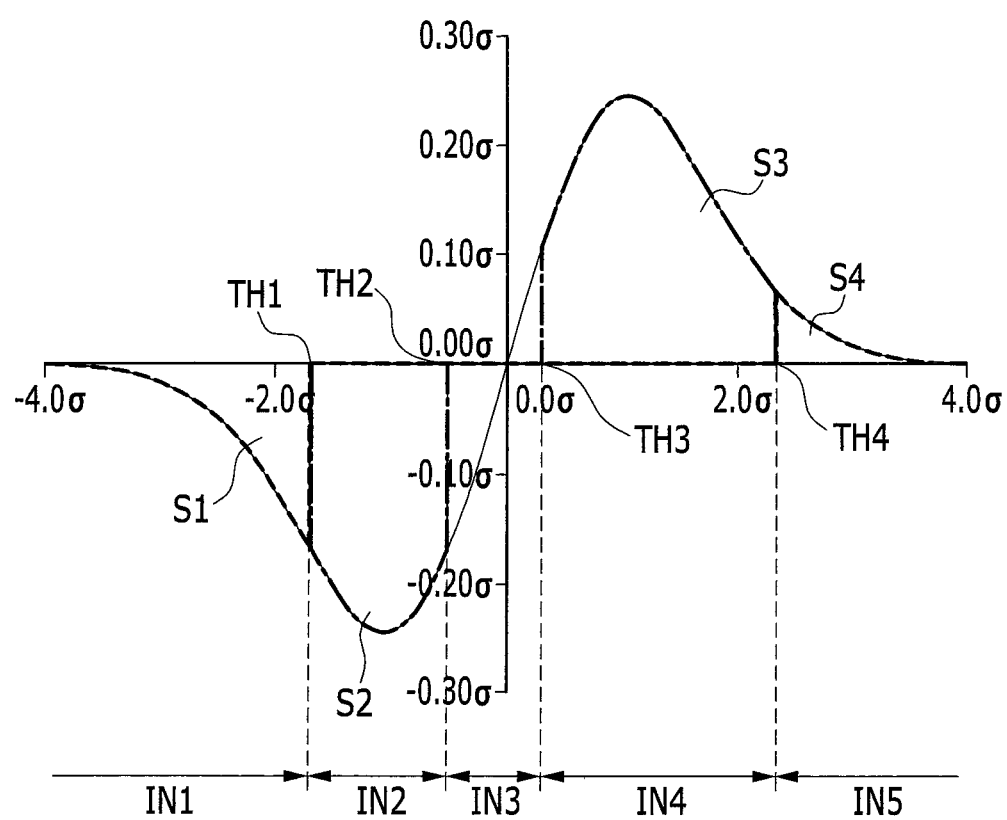
FIG. 6 is a drawing that illustrates control of the storage battery unit for the estimated distribution of the charge/discharge power data of the first example embodiment.

FIG. 6 is a drawing that illustrates one example of controlling the storage battery unit for the estimated distribution of the charge/discharge power data of the first example embodiment.

The calculation unit 124 sets the threshold value such that the charge/discharge power in a next control reference range (a sum of integrated values of ranges IN1 and IN5 for the first storage battery unit UN1, and a sum of integrated values of ranges IN2 and IN4 for the second storage battery unit UN2) is equal to a value that is obtained by multiplying a difference between the SOC value and the target value by electrical capacitance.

On the other hand, a relationship of a difference between the SOC value and the target value of the first storage battery B1 and a difference between the SOC value and the target value of the second storage battery B2 to the threshold values TH1 to TH4 may be calculated in advance by a simulation or experiment, and may be stored in the memory unit 130 in the form of a map or function.

Figure 7:
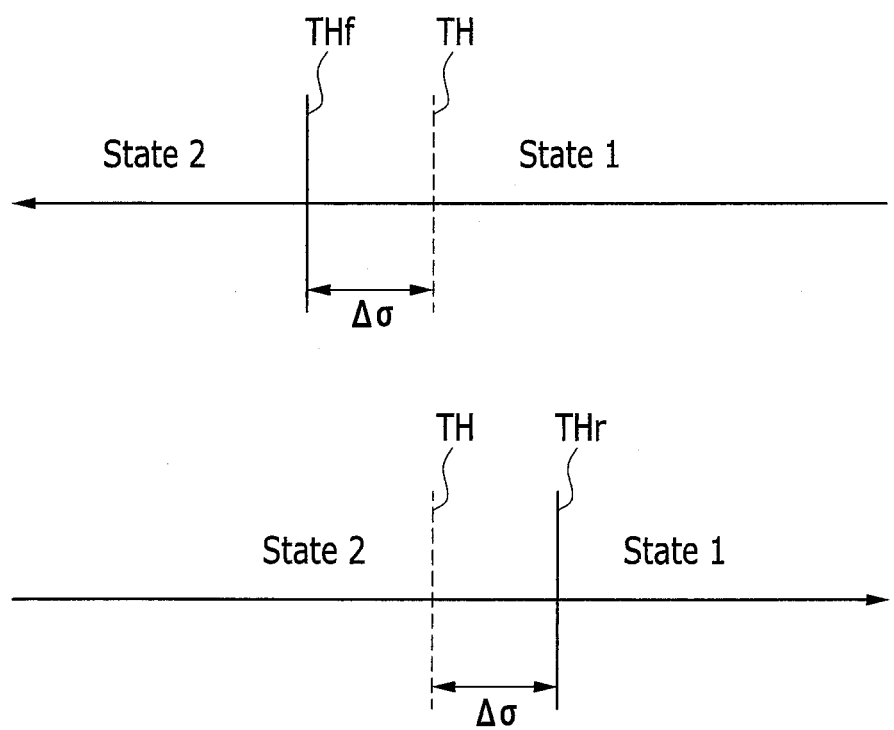
FIG. 7 is a drawing that illustrates one example of correcting a threshold value.

In addition, the calculation unit 124 may provide hysteresis in the calculated threshold value. FIG. 7 is a schematic diagram of one example of the threshold value when the hysteresis is provided.

For example, the calculation unit 124 may correct the calculated threshold value TH in every varying direction based on a correction amount (e.g., a predetermined correction amount) Δσ.

The calculation unit 124 sets THE (TH-Δσ) to a threshold value, for example, when an operational state of the storage battery unit is changed from a first state to a second state.

In addition, the calculation unit 124 sets THr (TH+Δσ) to the threshold value, for example, when an operational state of the storage battery unit is changed from a second state to a first state.

Accordingly, a frequent operation (ON) or stop (OFF) of the storage battery unit may be prevented or reduced. As a result, a lifespan of the storage battery can be extended.

The charge/discharge control unit 126 controls to charge/discharge the first storage battery unit UN1 or the second storage battery unit UN2 according to the next control reference period, the value for instructing to charge/discharge power stored in the memory unit 130, and four threshold values calculated by the calculation unit 124, such as the allocation switching threshold values TH1 and TH4 and operation stop switching threshold values TH2 and TH3.

On the other hand, when the value for instructing to charge/discharge power is received from the outside (e.g., from an external device or component) by the receiving unit 122, the charge/discharge control unit 126 may use the charging/discharging instruction value received by the receiving unit 122 instead of using the difference between the target charge/discharge power data and the moving average thereof.

A detailed charge/discharge control will now be described.

In the range IN1 below the threshold value TH1, the charge/discharge control unit 126 controls to charge the first storage battery unit UN1 and stop the second storage battery unit UN2.

In the range IN2 above the threshold value TH1 and below the threshold value TH2, the charge/discharge control unit 126 controls to stop the first storage battery unit UN1 and to charge the second storage battery unit UN2.

In the range IN3 above the threshold value TH2 and below the threshold value TH3, the charge/discharge control unit 126 controls to stop the first storage battery unit UN1 and the second storage battery unit UN2.

In the section IN4 above the threshold value TH3 and below the threshold value TH4, the charge/discharge control unit 126 controls to stop the first storage battery unit UN1 and to discharge the second storage battery unit UN2.

In the section IN5 above the threshold value TH4, the charge/discharge control unit 126 controls to discharge the first storage battery unit UN1 and to stop the second storage battery unit UN2.

Accordingly, each storage battery unit is operated with the SOC value not much separated from the target value. As a result, a lifespan of each storage battery may be extended.

In the example illustrated in FIG. 6, the first storage battery unit UN1 is controlled such that a probability (area S1) for performing the discharge is higher than a probability (area S2) for performing the charge.

In other words, the first storage battery unit UN1 is controlled such that the SOC value of the first storage battery B1 approximates the target value.

As a result, a lifespan of the first storage battery B1 may be extended.

In addition, the second storage battery unit UN2 is controlled such that a probability (zone S3) for performing the discharge is lower than a probability (zone S4) for performing the charge.

In other words, the second storage battery unit UN2 is controlled such that the SOC value of the second storage battery B2 approximates the target value.

As a result, a lifespan of the second storage battery B2 may be extended.

In addition, the second storage battery unit UN2 is operated in the stop state in the range IN3, so the charge/discharge is not performed for minimal power.

Accordingly, a use time of the second storage battery B2 may be reduced, and the lifespan of the storage battery may be extended.

Hereinafter, one example of an operation and process of the auxiliary power system 100 will be described with reference to FIG. 8.

Figure 8:
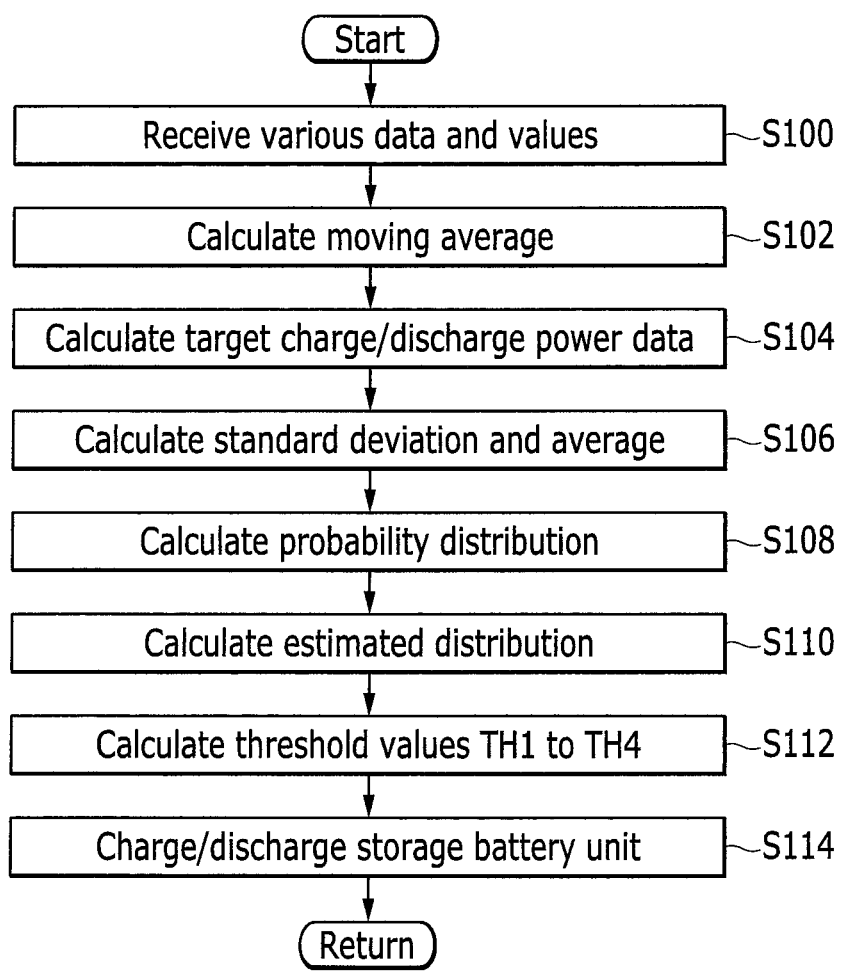
FIG. 8 is a flowchart that illustrates processes performed by the auxiliary power system according to the first example embodiment.

FIG. 8 is a flowchart illustrating processing flows performed by the auxiliary power system 100 of the first example embodiment.

First, a receiving unit (or receiver) 122 receives generated power data transmitted from a wind power generation system 500 at predetermined transmission time intervals for a control reference period.

In addition, the receiving unit 122 receives a SOC value of a first storage battery transmitted from a first storage battery unit UN1, and a SOC value of a second storage battery transmitted from a second storage battery unit UN2 (operation S100).

The receiving unit 122 stores generated power data, a value for instructing to charge/discharge power, and SOC values of the respective storage batteries that are received in a memory unit 130.

The receiving unit 122 matches the received generated power data and the received time, and stores them in the memory unit 130.

In addition, the receiving unit 122 stores the received value for instructing to charge/discharge power in the memory unit 130.

Further, the receiving unit 122 stores the received SOC value of the first storage battery and the received SOC value of the second storage battery in the memory unit 130.

Next, the calculation unit 124 calculates, for example, statistical values such as a moving average and the like from the generated power data stored in the memory unit 130 (operation S102).

Next, the calculation unit 124 calculates target charge/discharge power data within the control reference period based on a difference between the calculated moving average and the generated power data stored in the memory unit 130 (operation S104).

Next, the calculation unit 124 calculates a standard deviation σ and an average value μ of the target charge/discharge power data Pd(k) from the calculated target charge/discharge power data Pd(k), as an indicator value representing a spread degree of distribution (operation S106).

Next, the calculation unit 124 calculates a probability distribution representing probability density of the target charge/discharge power data, based on a normal distribution having the calculated standard deviation σ and average value μ as parameters (operation S108).

Next, the calculation unit 124 multiplies a deviation value representing the calculated probability variable of the probability distribution (horizontal axis) and an occurring frequency representing a curve of the calculated probability distribution (vertical axis), thereby calculating an estimated distribution of the charge/discharge power data (operation S110).

Next, the calculation unit 124 calculates and sets allocation switching threshold values TH1 and TH4 and operation stop switching threshold values TH2 and TH3, based on the estimated distribution of the calculated charge/discharge power data and the SOC values of the first and second storage batteries stored in the memory unit 130 (operation S112).

Next, the charge/discharge control unit 126 controls to charge/discharge the first storage battery unit UN1 or the second storage battery unit UN2, based on the target charge/discharge power data calculated by the calculation unit 124 and four threshold values of the allocation switching threshold values TH1 and TH4 and the operation stop switching threshold values TH2 and TH3 (operation S114).

Accordingly, the process of the current flowchart is terminated.

Although some embodiments of the present invention are described with respect to operations S100 through S114, according to some embodiments, certain operations may not be performed, additional operations may be performed, or the order of the operations may be modified, all without departing from the spirit and scope of the present invention.

According to the auxiliary power system 100 of the first example embodiment described above, degradation of the storage battery can be reduced by receiving the value for instructing to charge/discharge power for charging/discharging a plurality of storage batteries having different charge/discharge characteristics, calculating an indicator value indicating a spread degree of distribution of the value for instructing to charge/discharge power according to a history of the received value for instructing to charge/discharge power, and switching the storage batteries to be charged and discharged from a plurality of storage batteries according to the calculated indicator value.

As a result, a variation of the generated power of the power generation system can be more reduced, and a lifespan of the storage battery can be extended.

In addition, according to the auxiliary power system 100 of the first example embodiment, in the range IN3 above the threshold value TH2 and below the threshold value TH3, the charging/discharging is not performed for the minimal power by stopping the second storage battery unit UN2.

As a result, the number of usages of the second storage battery B2 can be reduced, and the lifespan of the storage battery may be extended.

An auxiliary power system 100 of a second example embodiment will now be described.

Here, a case in which a calculation unit 224 calculates a different probability distribution from the first example embodiment will be described.

A description of the same functions as in the aforementioned example embodiment will be omitted.

Figure 9:
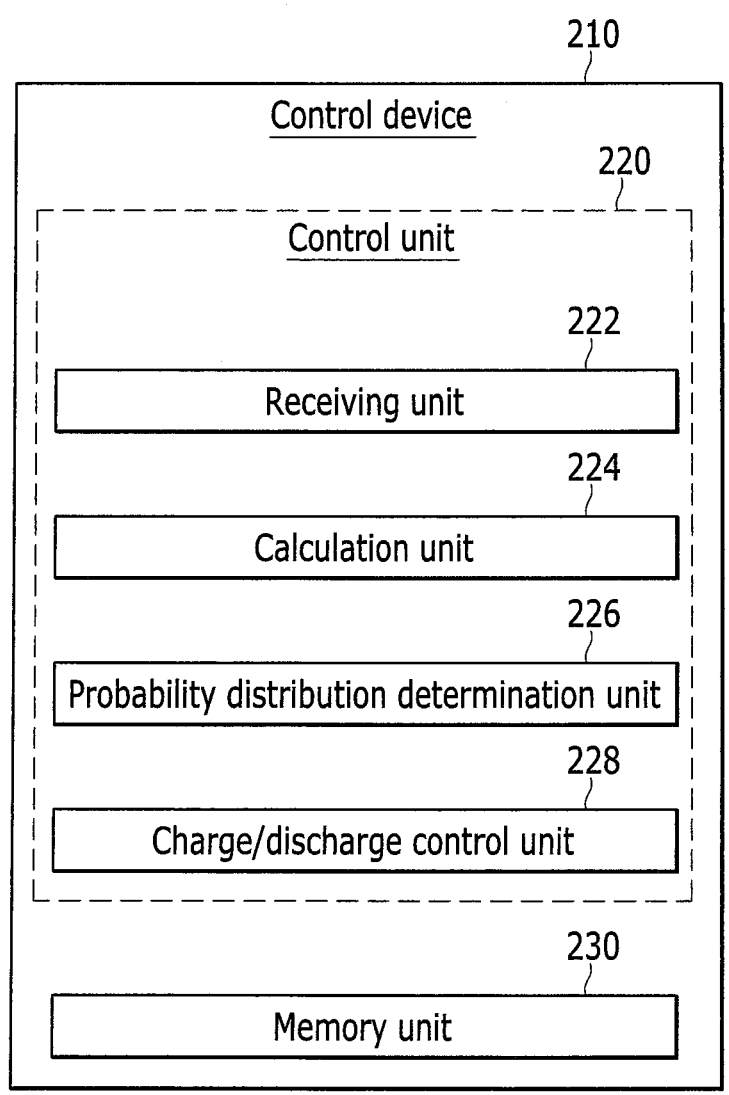
FIG. 9 is a drawing that illustrates a configuration of a control device according to a second example embodiment.

FIG. 9 is a drawing that illustrates one example of a functional configuration of a control device according to the second example embodiment.

The control device 210 includes a control unit 220 and a memory unit 230.

The control unit 220 includes, for example, a receiving unit 222, a calculation unit 224, a probability distribution determination unit 226, and a charge/discharge control unit 228.

The calculation unit 224 calculates, for example, a kurtosis and a skewness representing a distributional characteristic so as to determine whether data representing a frequency distribution shown in FIG. 3 approximates a normal distribution.

The kurtosis is an indicator value that represents a difference between left and right symmetry of the distribution, and the skewness is an indicator value that represents whether a shape of the distribution is sharp or flat.

The probability distribution determination unit 226 determines whether data of the frequency distribution illustrated in FIG. 3 approximates the normal distribution or not according to the kurtosis and the skewness calculated by the calculation unit 224.

On the other hand, the probability distribution determination unit 226 has a configuration in which the determination is performed based on the kurtosis and the skewness calculated by the calculation unit 224, but it is not limited thereto.

The probability distribution determination unit 226 may use, for example, any suitable testing technology such as a Shapiro-Wilk test or a Kolmogorov-Smirnov test to determine whether the data represented by the frequency distribution approximates to the normal distribution.

When the data included in the frequency distribution illustrated in FIG. 3 is determined by the probability distribution determination unit 226 to be approximate to the normal distribution, the charge/discharge control unit 228 controls to charge/discharge either one of the storage battery units.

In addition, when the data included in the frequency distribution illustrated in FIG. 3 is determined by the probability distribution determination unit 226 to not be approximate to the normal distribution, the calculation unit 224 calculates a different probability distribution.

The calculation unit 224 may calculate, for example, a log-normal distribution.

Hereinafter, the calculation unit 224 and other function units may perform the same processing as the first example embodiment.

On the other hand, any probability distribution can be selected if it is calculated by the calculation unit 224 and is appropriate for an actual power generation system model.

In addition, prior to the determination process of the probability distribution determination unit 226, the calculation unit 224 may not calculate the normal distribution but may directly calculate the log-normal distribution.

Accordingly, the auxiliary power system 100 may perform charging/discharging more appropriate for the actual power generation system model.

As a result, the variation of the generated power of the power generation system can be further reduced.

An auxiliary power system 100 of a third example embodiment will now be described.

Here, a case in which the auxiliary power system 100 includes two or more storage battery units, which is different from the first and second example embodiments, will be described, and a description of the same functions as in the aforementioned example embodiments will be omitted.

Figure 10:
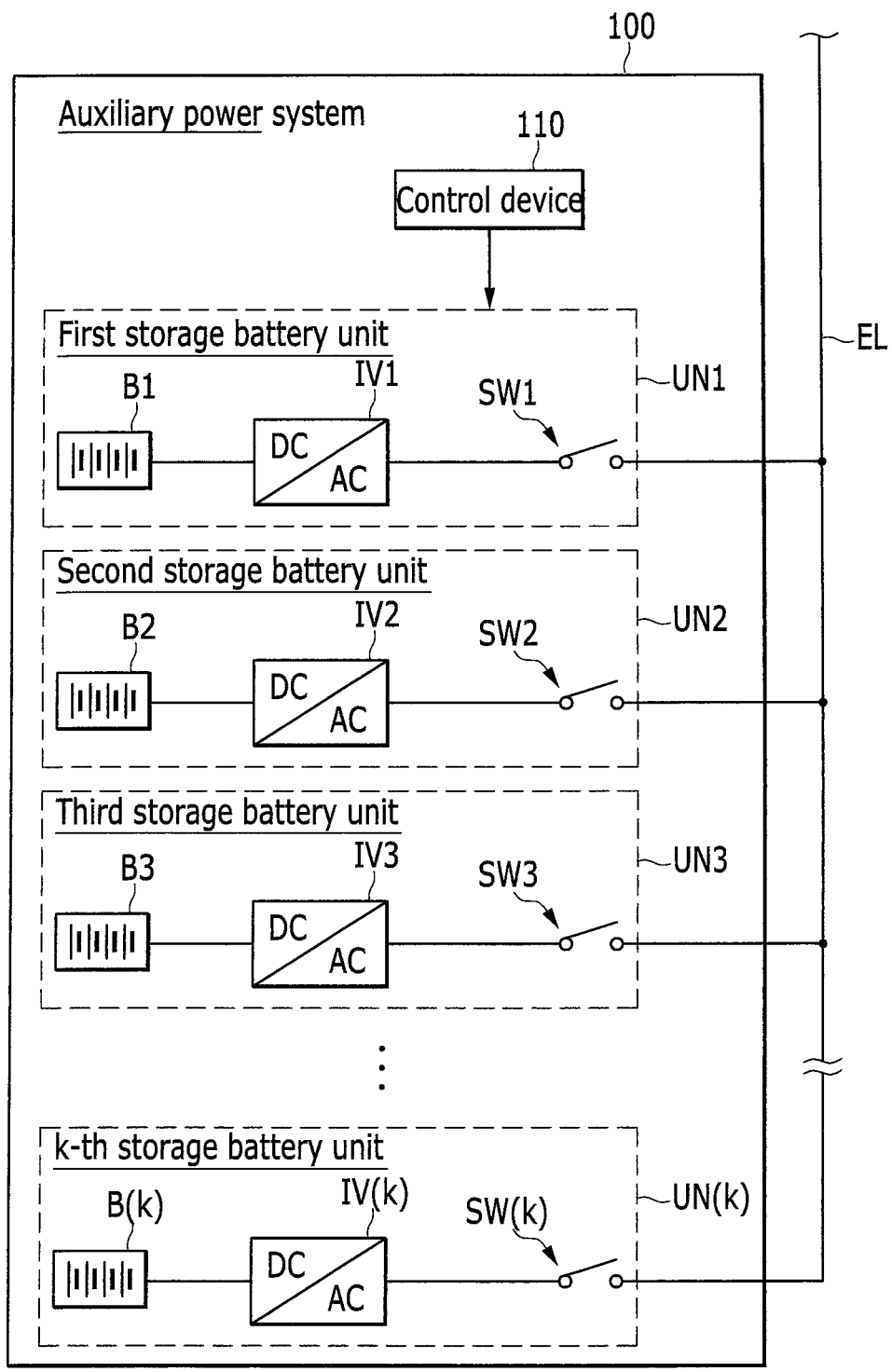
FIG. 10 is a drawing that illustrates a configuration of an auxiliary power system according to a third example embodiment.

FIG. 10 is a drawing that illustrates a configuration of an auxiliary power system 100 according to a third example embodiment.

The auxiliary power system 100 includes a control device 110 and first to k-th storage battery units UN1 to UN(k).

The first to k-th storage battery units UN1 to UN(k) are connected in parallel.

The letter k represents the number of storage batteries (storage battery units).

A case in which k is 3 is described as one example, but the present invention is not limited thereto.

The first storage battery B1 may be one of the first to third storage batteries B1 to B3 that has the greatest charge/discharge rate.

The second storage battery B2 may be, for example, one of the first to third storage batteries B1 to B3 that has a smaller charge/discharge rate than that of the first storage battery B1.

The third storage battery B3 may be one of the first to third storage batteries B1 to B3 that has the smallest charge/discharge rate.

A receiving unit 122 receives a SOC value of the first storage battery transmitted from the first storage battery unit UN1, a SOC value of the second storage battery transmitted from the second storage battery unit UN2, and a SOC value of the third storage battery transmitted from the third storage battery unit UN3.

The calculation unit 124 calculates and sets allocation switching threshold values TH1, TH2, TH5, and TH6 and operation stop switching threshold values TH3 and TH4 according to an estimated distribution of the calculated charge/discharge power data and the SOC values of the first to third storage batteries B1 to B3 stored in the memory unit 130.

On the other hand, a magnitude relationship of the threshold values TH1 to TH6 is TH6>TH5>TH4>TH3>TH2>TH1.

The charge/discharge control unit 126 controls to charge/discharge the storage battery units of any one of the first, second, and third storage battery units UN1, UN2, and UN3 based on a next control reference period, a value for instructing to charge/discharge power stored in the memory unit 130, allocation switching threshold values TH1, TH2, TH5, and TH6, and operation stop switching threshold values TH3 and TH4 that are calculated by the calculation unit 124.

A detailed charge/discharge control will now be described with reference to FIG. 11.

Figure 11:
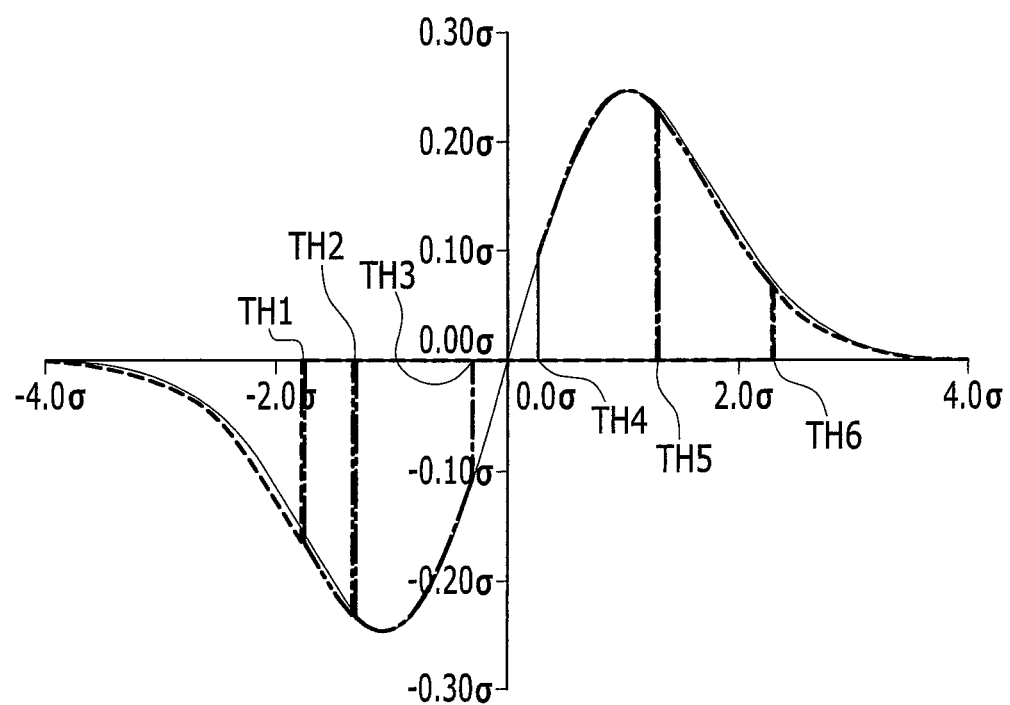
FIG. 11 is a drawing that illustrates a storage battery unit controlling an estimated distribution of charge/discharge power data according to a third example embodiment.

FIG. 11 is a drawing that illustrates one example of controlling a storage battery unit for an estimated distribution of the charge/discharge power data according to a third example embodiment.

Hereinafter, a detailed example of controlling charge and discharge will be described.

In a range below the threshold value TH1, the charge/discharge control unit 126 controls to charge the first storage battery unit UN1, while controlling to stop the second and third storage battery units UN2 and UN3.

In a range above the threshold value TH1 and below the threshold value TH2, the charge/discharge control unit 126 controls to charge the third storage battery unit UN3, while controlling to stop the first and second storage battery units UN1 and UN2.

In a range above the threshold value TH2 and below the threshold value TH3, the charge/discharge control unit 126 controls to charge the second storage battery unit UN2, while controlling to stop the first and third storage battery units UN1 and UN3.

In a range above the threshold value TH3 and below the threshold value TH4, the charge/discharge control unit 126 controls to stop all of the storage battery units.

In a range above the threshold value TH4 and below the threshold value TH5, the charge/discharge control unit 126 controls to discharge the second storage battery unit UN2, while controlling to stop the first and third storage battery units UN1 and UN3.

In a range above the threshold value TH5 and below the threshold value TH6, the charge/discharge control unit 126 controls to discharge the third storage battery unit UN3, while controlling to stop the first and second storage battery units UN1 and UN2.

In a range above the threshold value TH6, the charge/discharge control unit 126 controls to discharge the first storage battery unit UN1, while controlling to stop the second and third storage battery units UN2 and UN3.

Accordingly, the auxiliary power system 100 may more flexibly perform the power charge/discharge in accordance with three kinds of the storage batteries B1 to B3.

As a result, a variation of the generated power of the power generation system can be more reduced, and a lifespan of the storage battery can be extended.

On the other hand, in the current example embodiment, the discharge rate representing the charge/discharge characteristic of the third storage battery B3 is determined between the discharge rate of the first storage battery B1 and the discharge rate of the second storage battery B2, but it is not limited thereto.

The third storage battery B3 may have, for example, the same discharge rate and electrical capacitance as those of the second storage battery B2 and the first storage battery B1.

In this case, the charge/discharge control unit 126 appropriately controls such that electrical capacitance of the storage batteries of each storage battery unit approximates the target value.

An auxiliary power system 100 of a fourth example embodiment will now be described.

Here, a configuration in which the auxiliary power system 100 is connected to an electric power system EPS, which is different from the first, second, and third example embodiments will be described, and a description of the same functions as in the aforementioned example embodiments will be omitted.

Figure 12:
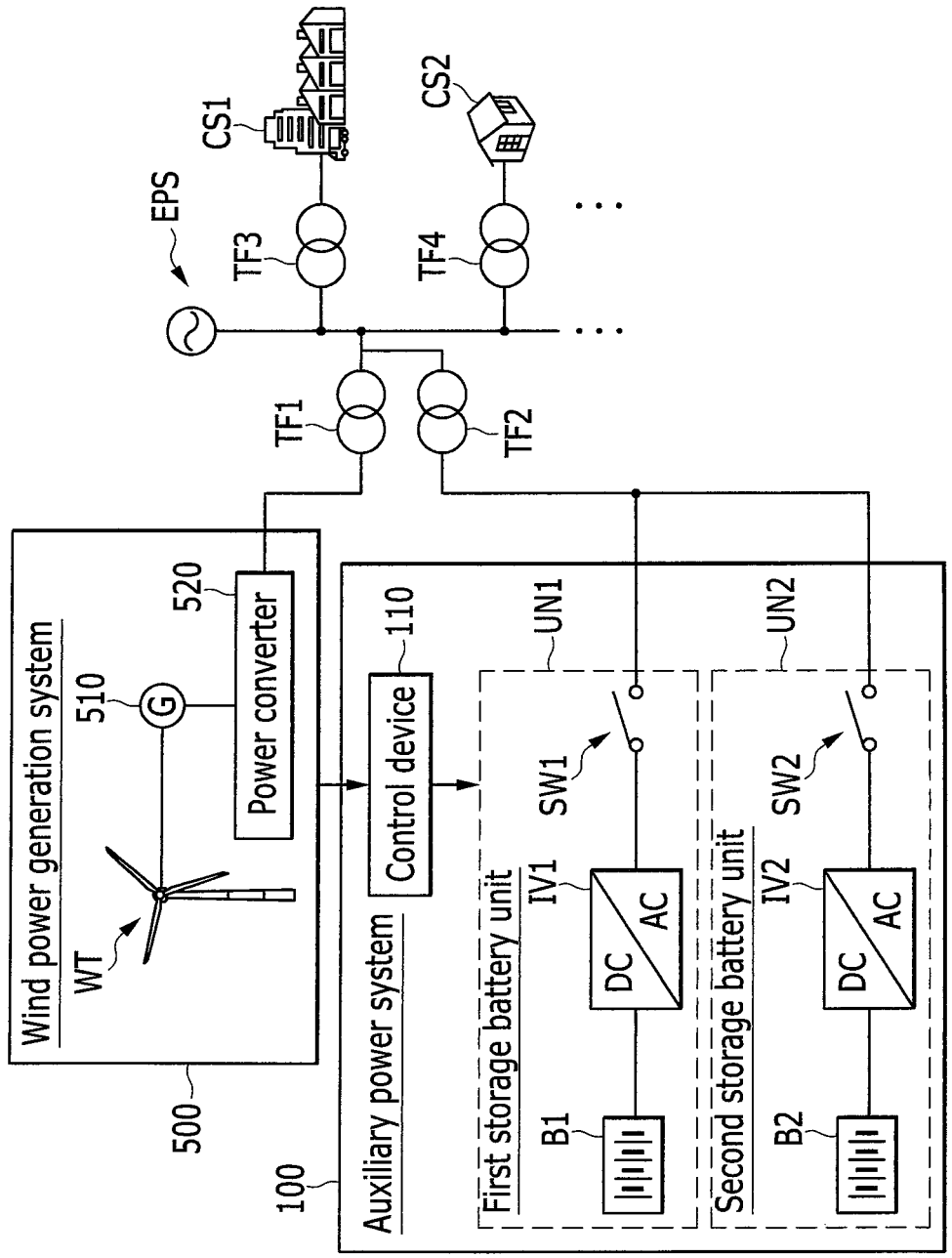
FIG. 12 is a drawing that illustrates one example of an auxiliary power system according to a fourth example embodiment.

FIG. 12 is a schematic diagram of one example of an auxiliary power system 100 according to a fourth example embodiment.

As shown in FIG. 12, a wind power generation system 500 is connected to the electric power system EPS via a transforming part TF1, an auxiliary power system 100 is connected thereto via a transforming part TF2, a user's receiving electric equipment CS1 is connected thereto via a transforming part TF3, and a user's receiving electric equipment CS2 is connected thereto via a transforming part TF4.

The electric power system EPS is a system in which power generation, transformation, transmission, and distribution are incorporated to provide generated power by the power generation system to the user's receiving electric equipment.

The transforming parts TF1 to TF4 are power devices for transforming (boosting) a voltage of AC power using electromagnetic induction.

Power transmitted from the wind power generation system 500 or the auxiliary power system 100 may be, for example, transformed into an ultra-high voltage (500 kV) or an extra-high voltage (220-275 kV) depending on the transforming parts TF1 and TF2, and is transmitted to the electric power system EPS.

In addition, the power distributed from the electric power system EPS is transformed into a high voltage (66-154 kV), for example, depending on the transforming parts TF3 and TF4, and is distributed to the user's receiving electric equipment CS1 and CS2.

On the other hand, there is no particular limit in the number of the transforming parts TF3 and TF4 or the user's receiving electric equipment CS1 and CS2.

In addition to the wind power generation system 500, a plurality of other wind power generation systems or solar power generation systems may be connected to the electric power system EPS.

The calculation unit 124 calculates a moving average from generated power data that is stored in the memory unit 130.

Here, the calculation unit 124 calculates the calculated moving average by adding value data, such as demand power data, that is an amount of power consumed by the receiving electric equipment CS1 and CS2 at the user side.

Accordingly, the auxiliary power system 100 may more efficiently charge and discharge the power.

In this case, some functions of the auxiliary power system 100 of the aforementioned example embodiment may also be implemented by a computer.

In this case, a program for implementing these functions may be stored in a computer-readable recording media, and the program stored in the recording media may be desirably read and then executed by a computer system, thereby implementing these functions.

On the other hand, the computer system described herein may include an operating system (OS) or hardware such as a peripheral device.

In addition, the computer-readable recording media may be a storage device such as a portable media such as a flexible disk, a magneto-optical disc, a ROM, a CD-ROM, or the like, or a hard disk embedded in the computer system.

Further, the computer-readable recording media may include a communication line that dynamically holds a program for a short time when transmitting a program via a communication line, such as a network like the Internet, a telephone line, or the like, and in that case, may desirably include a volatile memory inside the computer system which serves as a server or client that holds a program for a predetermined time.

Further, the program may desirably implement some of the aforementioned functions, or may implement the aforementioned functions in combination with the program that is already stored in the computer system.

The drawings and the detailed description of the present invention which are described above are merely illustrative, are just used for the purpose of describing the present invention, and are not used for qualifying the meaning or limiting the scope of the present invention, which is disclosed in the appended claims, and their equivalents. Therefore, it will be understood by those skilled in the art that various modifications and other equivalent example embodiments may be made from the present invention. Accordingly, an actual technical protection scope of the present invention is to be defined by the claims, and their equivalents.

DESCRIPTION OF SOME OF THE SYMBOLS

100: auxiliary power system
110, 210: control device
120, 220: control unit
122, 222: receiving unit
124, 224: calculation unit
126, 228: charge/discharge control unit 130, 230: memory unit
200: wind power generation system
226: probability distribution determination unit
500: wind power generation system
510: power generator
520: power converter
WT: windmill
EL: electrical line
TF1, TF2, TF3, TF4: transforming part
EPS: electric power system
CS1, CS2: receiving electric equipment
UN1: first storage battery unit
UN2: second storage battery unit
B1: first storage battery
B2: second storage battery
IV1, IV2: inverter
SW1, SW2: switch

What is claimed is:

1. An auxiliary power system comprising:
a plurality of storage batteries having different charge/discharge characteristics;
a receiving unit configured to externally receive a value for instructing to charge/discharge power for charging/discharging the plurality of storage batteries; and
a control unit configured to calculate an indicator value indicating a spread degree of distribution of the value for instructing to charge/discharge power and to change one or more of the storage batteries to be charged/discharged from the plurality of storage batteries according to the indicator value.

2. The auxiliary power system of claim 1, wherein the plurality of storage batteries comprises:
a first storage battery in which more power charging/discharging is performed with respect to electrical capacitance; and
a second storage battery in which less power charging/discharging is performed with respect to the electrical capacitance than in the first storage battery, wherein the control unit, after comparing a threshold value, based on the indicator value, with the value for instructing to charge/discharge power, is configured to charge/discharge the first storage battery when an absolute value of the value for instructing to charge/discharge power is greater than an absolute value of the threshold value, and to charge/discharge the second storage battery when an absolute value of the value for instructing to charge/discharge power is smaller than an absolute value of the threshold value.

3. The auxiliary power system of claim 1, wherein the control unit is configured to control electrical capacitance of each storage battery of the plurality of storage batteries to approximate a target value.

4. The auxiliary power system of claim 1, wherein the control unit is configured to calculate the indicator value according to the value for instructing to charge/discharge power during a control reference period according to an installation condition of the auxiliary power system.

5. The auxiliary power system of claim 1, wherein the control unit is configured to calculate a normal distribution by calculating a standard deviation as the indicator value when applying the value for instructing to charge/discharge power to the normal distribution.

6. The auxiliary power system of claim 5, wherein the control unit is configured to multiply a deviation value based on the standard deviation and an occurring frequency of the normal distribution to calculate an estimated distribution of an amount of power charged/discharged.

7. An auxiliary power system comprising:
a plurality of storage batteries having different charge/discharge characteristics;
a receiving unit configured to receive generated power data corresponding to an amount of power generated via an external power generation system;
a calculation unit configured to calculate target charge/discharge power data corresponding to a required amount of power charged/discharged based on a predetermined number of recently received pieces of the generated power data and to calculate a probability distribution from a group of the target charge/discharge power data; and
a control unit configured to selectively charge/discharge the plurality of storage batteries based on the probability distribution.

8. The auxiliary power system of claim 7, wherein the calculation unit is configured to calculate an estimated distribution of the charge/discharge power data of a following second period, and the control unit is configured to selectively charge/discharge the plurality of storage batteries according to the estimated distribution of the charge/discharge power data.

9. The auxiliary power system of claim 8, wherein the estimated distribution of the charge/discharge power data is calculated by multiplying a deviation value and an occurring frequency of the probability distribution.

10. The auxiliary power system of claim 9, wherein the plurality of storage batteries comprise a first storage battery and a second storage battery, a threshold value is calculated based on state of charge (SOC) values of the first storage battery and the second storage battery and the estimated distribution of the charge/discharge power data, and the control unit is configured to control charge/discharge of the first storage battery and the second storage battery based on the threshold value.

11. The auxiliary power system of claim 10, wherein a charge/discharge rate of the first storage battery is greater than that of the second storage battery, and
the control unit is configured to charge/discharge the first storage battery when an absolute value of a value of the target charge/discharge power data is greater than an absolute value of the threshold value, and to charge/discharge the second storage battery when an absolute value of a value of the target charge/discharge power data is less than an absolute value of the threshold value.

* * * * *